Jan. 10, 1939.                C. H. KRENGEL                2,143,781
                        WING-TYPE CORRUGATING SHOVEL
                           Filed April 7, 1938
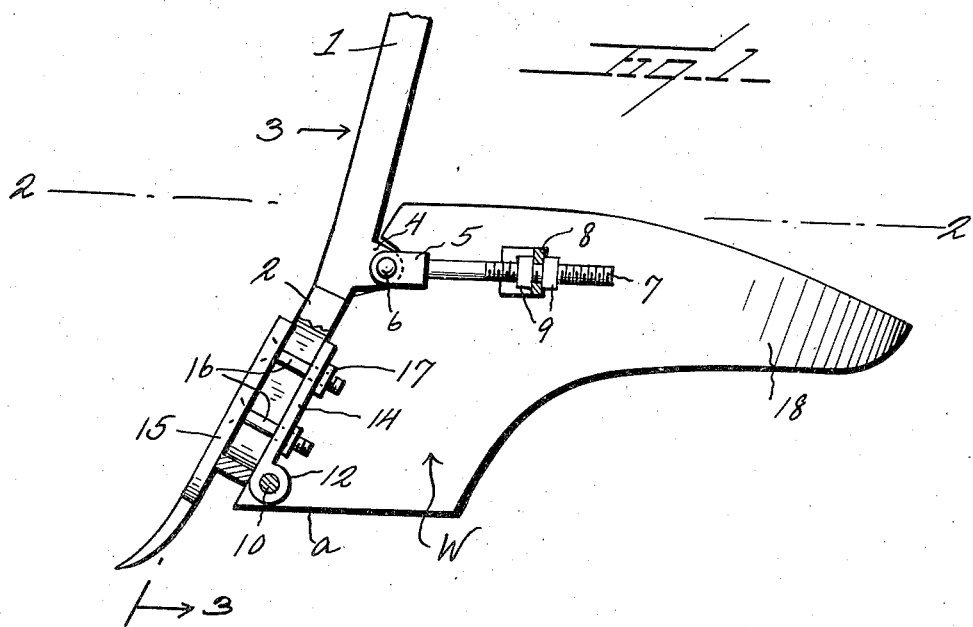
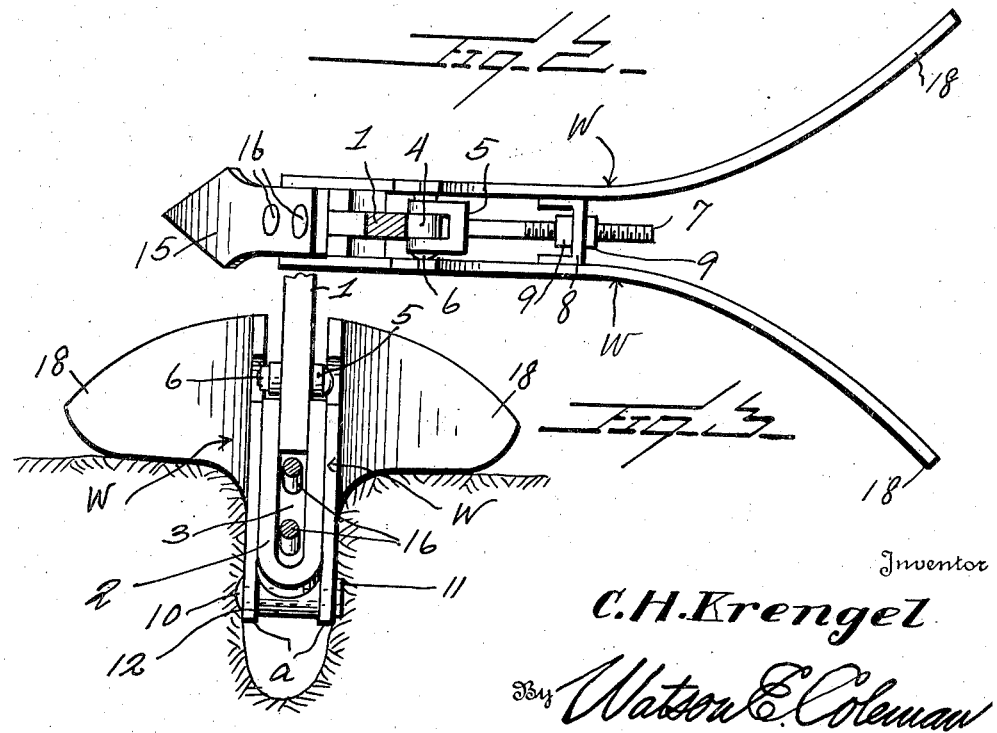
Inventor
C. H. Krengel
By Watson E. Coleman
            Attorney Patented Jan. 10, 1939

2,143,781

UNITED STATES PATENT OFFICE 2,143,781

WING-TYPE CORRUGATING SHOVEL

Charles H. Krengel, Twin Falls, Idaho

Application April 7, 1938, Serial No. 200,781

3 Claims. (Cl. 97—205)

This invention relates to a corrugating shovel and has relation more particularly to a shovel of this kind of a wing-type, and it is primarily an object of the invention to provide a ground working device of this kind which can be readily applied to conventional tractor tool attachments, cultivators and the like, and which operates to produce a corrugation that is relatively narrow, deep and smooth.

The invention also has for an object to provide a corrugating shovel of a type which is particularly advantageous in corrugating alfalfa, clover and other crops as there is no resultant danger to the plant roots.

A further object of the invention is to provide a device of this character which is provided with wings to press the sides and spread out the soil to eliminate ridges or uneven spots and wherein the device or implement is of a character that can be quickly and conveniently applied in working position.

The invention consists in the details of construction and in the combination and arrangement of the several parts of my improved corrugating shovel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Fig. 1 is a view in side elevation of a plow attachment constructed in accordance with an embodiment of my invention, the clevis standard being in fragment;

Fig. 2 is a view in section taken substantially on the line 2—2 of Fig. 1;

Fig. 3 is a view in section taken substantially on the line 3—3 of Fig. 1, with a corrugation diagrammatically illustrated.

As disclosed in the accompanying drawing, I denotes a standard or sheth of desired length which is adapted to be attached to any desired part of a tractor attachment, cultivator or other type of ground working machines when it is desired to produce a relatively narrow, deep and even corrugation.

The lower end portion of the standard or sheth I carries a loop member 2 rigid to the standard or sheth I and providing an elongated slot 3 of desired dimensions.

The standard or sheth I above but in close proximity to the loop member 2 is provided with a rearwardly disposed lug 4 straddled by a clevis 5, said clevis being pivotally secured to the lug 4 by the bolt 6.

This clevis 5 is carried by the forward end portion of an elongated threaded shank 7 which extends through a member or bar 8 interposed between and secured to the upper and forward portions of the side wings W. Threaded upon the shank 7 and positioned at opposite sides of the member or bar 8 are the nuts 9. By proper manipulation of these nuts 9, the shank 7 may be adjusted longitudinally to a selected position and effectively locked in such selected position by the coaction of the nuts 9 with the member or bar 8.

The wings W are flat and arranged side by side in substantial parallelism with the lower margins $a$ of the wings W positioned a slight distance below the loop member 2 and disposed on a desired angle with respect thereto.

The lower forward portions of the wings W are connected by the headed shank 10 and disposed through the wings and held in position through the instrumentality of a nut 11 or otherwise as may be preferred. This shank 10 is also directed through a sleeve 12 interposed between the lower forward end portions of the wings W and carried by an upstanding elongated clip 14. This clip 14 extends along the inner face of the loop member 2 and has close contact therewith as is particularly illustrated in Fig. 1. Overlying the forward face of the loop member 2 is an elongated corrugating shovel 15 through which are directed from without the headed members 16. These members 16 are of a length to extend through and inwardly beyond the clip 14, and the rear or free end portions of said bolt 16 have threaded thereon the holding and clamping nuts 17. Through the medium of these bolts 16 and nuts 17, the shovel 15 together with the lower portions of the wings W are effectively maintained in applied or working position.

By varying the angle of the lower edge $a$ of each of the wings W with respect to the loop member 2, the depth of penetration of the shovel 15 into the ground may be regulated and this variation of angle can be readily accomplished by an endwise adjustment or shifting in the desired direction of the shank 7. Furthermore, the depth of penetration can be regulated or controlled by adjusting the plow 15 and the wings W along the loop member 2 as permitted by the slot 3.

During the cutting operation, the wings W extend almost to the bottom of the corrugation, thus assuring smooth side walls. The upper rear portions of the wings W have extending outwardly and laterally therefrom on a predetermined curvature the extension wings 18 which serve to effectively smooth out any ridges or uneven spots which may be encountered at either side of the corrugation.

From the foregoing description, it is thought to be obvious that a corrugating shovel constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice except as hereinafter claimed.

What is claimed is:

1. A corrugating attachment, comprising an attaching standard, side wings, means for pivotally connecting the lower forward portions of the wings to the lower portion of the standard to allow said wings to be raised or lowered, said wings being substantially flat and in parallelism, a corrugating shovel carried by the lower portion of the standard and extending below the lower edges of the wings, and coacting means carried by the standard and the wings for swinging the wings into different selective positions with respect to the standard.

2. A corrugating attachment, comprising an attaching standard, side wings pivotally engaged with the lower portion of the standard, said wings being substantially flat and in parallelism, a corrugating shovel carried by the lower portion of the standard and extending below the lower edges of the wings, a member interposed between and connecting the upper portions of the wings, an elongated shank pivotally connected to the standard and extending through the member, and means carried by the shank and coacting with the member for holding the shank in selective endwise adjustment.

3. A corrugating attachment, comprising a standard having a loop member at its lower extremity, a pair of substantially flat wings arranged side by side, a member connecting the lower forward portions of the wings, an elongated clip interposed between the wings and having a sleeve through which said member is disposed to permit relative swinging movement of the wings and clip, said clip contacting with the rear face of the loop member, a corrugating plow contacting with the front face of the loop member of the standard, and means coacting with the shovel and the clip and extending through the loop member for holding the shovel and the clip to said loop member.

CHARLES H. KRENGEL.